(12) United States Patent
Deininger et al.

(10) Patent No.: US 10,759,372 B2
(45) Date of Patent: Sep. 1, 2020

(54) SOFT TOUCH INTERIOR TRIM FOR VEHICLES

(71) Applicant: GRUPO ANTOLÍN-INGENIERÍA, S. A., Burgos (ES)

(72) Inventors: Walter Deininger, Allershausen (DE); Alfred Peintinger, Allershausen (DE)

(73) Assignee: GRUPO ANTOLÍN-INGENIERÍA, S.A., Burgos (ES)

( * ) Notice: Subject to any disclaimer, the term of this patent is extended or adjusted under 35 U.S.C. 154(b) by 0 days.

(21) Appl. No.: 15/660,160

(22) Filed: Jul. 26, 2017

(65) Prior Publication Data

US 2018/0334128 A1    Nov. 22, 2018

(30) Foreign Application Priority Data

May 16, 2017 (EP) ..................................... 17382278

(51) Int. Cl.
*B60R 21/215* (2011.01)
*B60R 13/02* (2006.01)
(Continued)

(52) U.S. Cl.
CPC .............. *B60R 21/215* (2013.01); *B32B 5/02* (2013.01); *B32B 5/18* (2013.01); *B32B 5/22* (2013.01);
(Continued)

(58) Field of Classification Search
CPC ..... B60R 13/00; B60R 13/02; B60R 13/0212; B60R 13/0218; B60R 13/0225; B60R 13/0231; B60R 13/0237; B60R 13/0243; B60R 13/025; B60R 13/0256; B60R 13/0262; B60R 13/0268;
(Continued)

(56) References Cited

U.S. PATENT DOCUMENTS 2,999,041 A * 9/1961 Lappala ................. B32B 27/00
                                                            428/317.9
3,864,181 A * 2/1975 Wolinski .................... C08J 9/32
                                                              428/904
(Continued)

FOREIGN PATENT DOCUMENTS

DE     102013215107 A1     4/2014
DE     102013224996 A1 *   6/2015  ........... B60R 21/215
WO     WO-2014125367 A1 *  8/2014  ........... C08J 9/0085

OTHER PUBLICATIONS

Machine translation (Espacenet) of DE 102013224996 A1. Translated Apr. 30, 2019. (Year: 2019).*
(Continued)

*Primary Examiner* — Maria V Ewald
*Assistant Examiner* — Ethan A. Utt
(74) *Attorney, Agent, or Firm* — Banner & Witcoff, Ltd.

(57) ABSTRACT

Soft touch interior trim for vehicles having a substrate, a soft touch layer and a double layered synthetic skin having a low weight, and comprising a decorative front layer and a supporting back layer with a filler. The synthetic skin has a reduced weight, and a good behavior when the airbag placed under the interior trim is triggered, in order to ensure a reliable release of the airbag and at the same time fulfilling the high quality aesthetic requirements usually demanded for this kind of interior parts, even after years of use.

11 Claims, 2 Drawing Sheets

(51) Int. Cl.
  *B32B 5/02*   (2006.01)
  *B32B 5/18*   (2006.01)
  *B32B 5/22*   (2006.01)
  *B32B 27/20*  (2006.01)

(52) U.S. Cl.
  CPC .............. *B32B 27/20* (2013.01); *B60R 13/02* (2013.01); *B32B 2605/003* (2013.01)

(58) Field of Classification Search
  CPC .... B60R 2013/0281; B60R 2013/0287; B60R 21/00; B60R 21/02; B60R 21/04; B60R 21/0428; B60R 21/045; B60R 21/055; B60R 2021/0002; B60R 2021/0004; B60R 2021/0006; B60R 2021/0009; B60R 2021/0039; B60R 2021/0048; B60R 2021/0293; B60R 2021/0435; B60R 2021/0442; B60R 21/16; B60R 21/20; B60R 21/205; B60R 21/206; B60R 21/21; B60R 21/213; B60R 21/214; B60R 21/215; B60R 21/2165; B60R 2021/161; B60R 2021/215; B60R 2021/21512; B60R 2021/21531; B60R 2021/21537; B60R 2021/21543; B60R 2021/21652; B60R 2021/21654; C08J 9/00; C08J 9/0085; C08J 9/0095; C08J 9/32; C08J 9/0014; C08J 9/0023; C08J 5/00; C08J 5/18; Y10T 428/249953–249959; Y10T 428/24996; Y10T 428/249961–249969; Y10T 428/24997; Y10T 428/249971–249979; Y10T 428/24998; Y10T 428/249981–249989; Y10T 428/24999; Y10T 428/249991–249993; Y10T 428/15; Y10T 428/23; Y10T 428/233; Y10T 428/239; Y10T 428/24273; Y10T 428/24298; Y10T 428/24306; Y10T 428/24314; Y10T 428/24322; Y10T 428/24331; Y10T 428/24355; Y10T 428/24364; Y10T 428/24372; Y10T 428/24397; Y10T 428/24438; Y10T 428/24479; Y10T 428/24496; Y10T 428/24504; Y10T 428/24512; Y10T 428/24521; Y10T 428/24554; Y10T 428/24612; Y10T 428/24942; Y10T 428/2495; Y10T 428/24967; Y10T 428/24975; Y10T 428/24983; Y10T 428/24992; Y10T 428/249924; Y10T 428/249933; Y10T 428/249939; Y10T 428/24994; Y10T 428/24995; Y10T 428/25; Y10T 428/253; Y10T 428/26; Y10T 428/263; Y10T 428/264; Y10T 428/265; Y10T 428/266; Y10T 428/268; Y10T 428/269; Y10T 428/27; Y10T 428/273; Y10T 428/29; Y10T 428/2913; Y10T 428/2915; Y10T 428/2927; Y10T 428/298; Y10T 428/2982; Y10T 428/31551; Y10T 428/31554; Y10T 428/31573; Y10T 428/3158; Y10T 428/31583; Y10T 428/31587; Y10T 428/31591; Y10T 428/31855; Y10T 428/3188; Y10T 428/31884; Y10T 428/31888; Y10T 428/3189; Y10T 428/31909; Y10T 428/31913; Y10T 428/3192; Y10T 428/31928; Y10T 428/31935; Y10T 428/31938; Y10T 428/31971; B32B 3/00; B32B 3/02; B32B 3/24; B32B 3/26; B32B 3/263; B32B 3/266; B32B 3/30; B32B 5/00; B32B 5/02; B32B 5/16; B32B 5/18; B32B 5/20; B32B 5/22; B32B 5/24; B32B 5/245; B32B 5/26; B32B 5/28; B32B 5/30; B32B 5/32; B32B 7/00; B32B 7/04; B32B 7/05; B32B 7/06; B32B 23/00; B32B 23/02; B32B 23/04; B32B 23/048; B32B 23/08; B32B 23/10; B32B 27/00; B32B 27/04; B32B 27/06; B32B 27/065; B32B 27/08; B32B 27/12; B32B 27/14; B32B 27/18; B32B 27/20; B32B 27/30; B32B 27/302; B32B 27/304; B32B 27/32; B32B 27/40; B32B 2262/00; B32B 2262/04; B32B 2264/00; B32B 2264/04; B32B 2266/00; B32B 2266/02; B32B 2266/02; B32B 2266/14; B32B 2266/0221; B32B 2266/0235; B32B 2266/0278; B32B 2266/0292; B32B 2305/00; 2305/02; B32B 2305/022; B32B 2305/30; B32B 2307/582; B32B 2317/18; B32B 2327/06; B32B 2375/00; B32B 2323/00; B32B 2323/10; B32B 2355/00; B32B 2355/02; B32B 2605/00; B32B 2605/003; B32B 2605/08; C08K 5/00; C08K 5/04; C08K 5/15; C08K 5/151; C08K 5/1545; C08K 7/00; C08K 7/02; C08L 75/00; C08L 75/04; C08L 75/06; C08L 75/08; C08L 75/10; C08L 75/12; C08L 75/14; C08L 75/16; C08L 27/00; C08L 27/02; C08L 27/04; C08L 27/06; B29L 31/30; B29L 31/3005; B29L 31/3008; B29L 31/3011; B29L 31/3014; B29L 31/302; B29L 31/3026; B29L 31/3038; B29L 31/3041; B29L 2031/30; B29L 2031/3005; B29L 2031/3008; B29L 2031/3011; B29L 2031/3014; B29L 2031/302; B29L 2031/3026; B29L 2031/3038; B29L 2031/3041; Y10S 428/904; D06N 3/00; D06N 3/0002; D06N 3/0004; D06N 3/0006; D06N 3/0009; D06N 3/0011; D06N 3/0013; D06N 3/0015; D06N 3/0025; D06N 3/0027; D06N 3/004; D06N 3/0043; D06N 3/007; D06N 3/0075; D06N 3/02; D06N 3/04; D06N 3/06; D06N 3/065; D06N 3/08; D06N 3/12; D06N 3/14; D06N 3/141; D06N 3/142; D06N 3/143; D06N 3/144; D06N 3/145; D06N 3/146; D06N 3/147; D06N 3/148; D06N 3/18; D06N 3/183; D06N 3/186

USPC ......... 428/317.9, 313.3, 313.5, 313.7, 313.9, 428/304.4–319.9, 43, 68, 71, 76, 131, 428/134–138, 141–143, 146, 151, 156, 428/158–161, 165, 172, 212, 213, 215, 428/216, 218–220, 292.1, 295.1, 297.1, 428/297.4, 300.7, 309.9, 316.6, 318.4, 428/323, 326, 332, 334–341, 357, 364, 428/365, 372, 401, 402, 423.1, 423.3, 428/424.2, 424.6, 424.7, 424.8, 425.1, 428/500, 507–510, 515, 516, 518, 520, 428/522, 523, 532, 904; 280/727, 728.1, 280/782.3, 730.1, 730.2, 732

See application file for complete search history.

(56) References Cited

U.S. PATENT DOCUMENTS

| | | | | |
|---|---|---|---|---|
| 5,335,935 A | * | 8/1994 | Proos | B60R 21/2165 |
| | | | | 280/728.3 |
| 5,650,115 A | * | 7/1997 | Proos | B60R 21/2165 |
| | | | | 264/400 |
| 2006/0062993 A1 | | 3/2006 | Ogata et al. | |
| 2007/0145641 A1 | * | 6/2007 | Donatti | B60R 13/02 |
| | | | | 264/309 |
| 2009/0295011 A1 | * | 12/2009 | Smith | B60R 13/02 |
| | | | | 264/101 |
| 2012/0003456 A1 | * | 1/2012 | Marchgraber | C08J 9/35 |
| | | | | 428/317.9 |
| 2013/0261240 A1 | * | 10/2013 | Yasuhara | C08L 33/12 |
| | | | | 524/292 |
| 2014/0217708 A1 | * | 8/2014 | Pickett | B60R 21/2165 |
| | | | | 280/728.3 |

OTHER PUBLICATIONS

Rouette, Hans-Karl. (2001). Encyclopedia of Textile Finishing—Viscose Fibre Properties in Comparison to Other Cellulosic Fibres. Woodhead Publishing. Retrieved from app.knovel.com/hotlink/pdf/id:kt003VZN52/encyclopedia-textile/viscose-fibre-properties (Year : 2001).*

Sep. 27, 2017—(EP) Extended Search Report—App 17382278.4.

* cited by examiner

SOFT TOUCH INTERIOR TRIM FOR VEHICLES

The present application claims foreign priority under 35 U.S.C. 119 to European Patent Office Application No. EP 17382278 filed May 16, 2017, the content of which is incorporated by reference herein in its entirety.

FIELD OF THE INVENTION

The present invention relates to soft touch interior trim for vehicles having a substrate, a soft touch layer and a double layered synthetic skin having a low weight, and comprising a decorative front layer and a supporting back layer with a filler.

BACKGROUND OF THE INVENTION

Soft touch interior trims for vehicles normally comprise a substrate, a soft touch layer and a decorative skin.

The decorative skin can be a natural skin such as leather or a synthetic skin such as a PVC, TPU or TPE skin.

Synthetic skins are often used in the vehicle interior as decorative covering for the different interior trims such as instrument panels, door panels or pillar trims because this kind of skins allows adapting the interior trims to a wide range of styles for the different vehicle models.

It is because the manufacturing processes of the synthetic skins are capable of making different textures and colors.

It is known several processes for manufacturing this kind of synthetic skins for the vehicle industry. Some examples of these are slush molding or spray molding. The materials normally used in these processes are PVC, TPU, or TPE.

One of the main targets for these conventional synthetic skins is the weight reduction.

One approach to tackle this target is the reduction of the thickness of the synthetic skin. It is particularly relevant in the case of large components such as the instrument panel in which a reduction of a few tenths of millimetres means a significant weight reduction.

However when the thickness of the synthetic skin is too much reduced it arises other problems, particularly an aesthetic problem and a safety problem.

The aesthetic problem it is because a skin with a too much reduced thickness is more susceptible to deteriorate during the manufacturing process of the skin due to its tendency to shrink, and as well, during the manufacturing process of the interior trim due to the usually high temperatures of the material of the soft foam layer. Moreover, a skin with too much reduced thickness is as well more susceptible to deteriorate when the interior trim is in use in the vehicle interior after years of use.

The safety problem is the most important problem of them. This problem is due to the uncontrolled behavior of the synthetic skin when an airbag placed under the interior trim is triggered when the synthetic skin is too thin.

As the synthetic skin comes thinner, its tendency to flow instead of tearing goes greater, losing control on the way the skin tears, and consequently preventing a correct deployment of the airbag.

This problem becomes even worse, when the synthetic skin material is exposed to high temperatures, for instance, in summer time after several hours under the sunshine.

Other approach to tackle the weight saving target is replacing part of the thickness of the external high quality aesthetic synthetic skin by a lighter second layer, placed on its back side, achieving this way a global reduction of the superficial density of the synthetic skin. According to this solution it is known a double layer skin which comprises a high quality decorative front layer with a small thickness and a supporting back layer made of foam. The foam configuration of the back layer allows reducing the density of the total synthetic skin, and consequently reducing its total weight.

One example to illustrate this solution is the German patent DE102013215107.

However in this second case it is demonstrated that the behavior of the synthetic skin when the airbag is triggered is also uncontrolled, because the risk of a poor tearing becomes higher, and consequently the risk of improper airbag deployment and of uncontrolled fly-out of particles becomes higher too.

In this precedent, the second skin layer comprises a non-homogeneous foamed back layer due to the presence of irregular voids, of very different sizes. It results in a second skin layer with lack of homogeneity of its mechanical properties. Consequently, at the time of triggering the airbag, the starting point and the path of the tearing line of the synthetic skin, become unpredictable and uncontrolled.

In view of the disadvantages mentioned above, the object of the invention is a soft touch interior trim for vehicles with a synthetic skin, having a reduced weight, and a good behavior when the airbag placed under the interior trim is triggered, in order to ensure a reliable release of the airbag and at the same time fulfilling the high quality aesthetic requirements usually demanded for this kind of interior parts, even after years of use.

DESCRIPTION OF THE INVENTION

The present invention is established and characterised by the independent claims, while the dependent claims describe additional features thereof.

The intimately bond between the supporting back layer and the decorative front layer makes that the mechanical properties of the supporting back layer being transferred to the whole synthetic skin, improving this way its behaviour.

The specific configuration of the synthetic skin having a thickness lower than 1.2 mm allows reducing the weight of the synthetic skin, and consequently the total weight of the interior trim.

The specific configuration of the synthetic skin having two layers, particularly a decorative high quality front layer and a supporting back layer, allows keeping a good aesthetic condition and an adequate control of the airbag deployment when the airbag is triggered.

The good aesthetic condition is possible due to the decorative front layer can be chosen with good aesthetic properties which can be kept at any time and under demanding temperature conditions due to the supporting back layer acts as protective layer, specially during the manufacturing process of the soft touch interior trim.

The adequate behavior of the synthetic skin when the airbag is triggered is possible due to the presence of the filler within the supporting back layer, having a predefined low weight ratio and a specific low size.

On the one hand the filler produces discontinuities in the structure of the supporting back layer. These discontinuities allow decreasing the break point limit of this layer when the airbag is triggered in such a way that the synthetic skin is broken more easily. Consequently it is possible to start the tearing of the synthetic skin before its material starts to flow.

On the other hand the small size of the filler allows a good distribution of it, despite comprising a low amount of filler.

Therefore the presence of discontinuities throughout the supporting back layer is homogenous allowing ensuring the reduction of its break point limit.

Thus, when the airbag is triggered, the skin is easily teared, according to a predefined way, starting at predefined points, at the right moment and consequently in a controlled way. It involves a controlled airbag deployment.

Moreover, the reduced amount of filler used allows keeping the total weight reduction of the synthetic skin.

DESCRIPTION OF THE FIGURES

The present specification is completed by a set of figures that illustrate a preferred embodiment and in no way limit the invention.

DETAILED DESCRIPTION OF THE INVENTION

Figure 1:
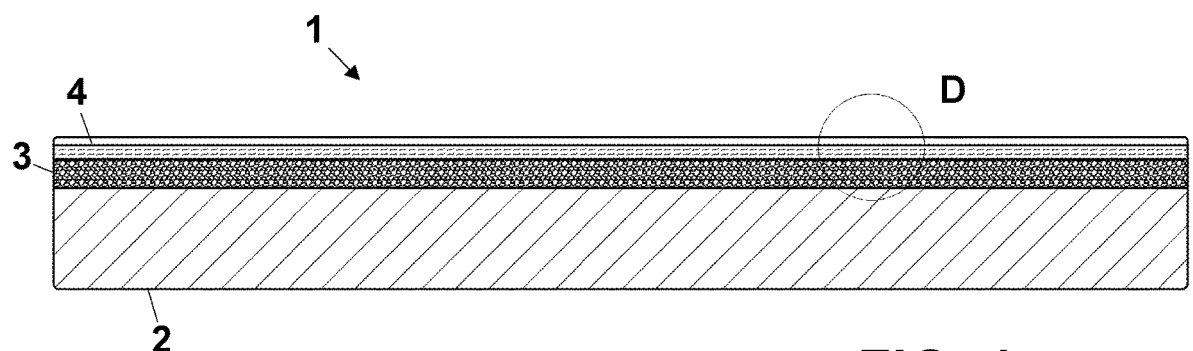
FIG. 1 shows a schematic sectional view of the soft touch interior trim for vehicles where the different layers of its structure can be appreciated.

FIG. 1 shows the soft touch interior trim (1) for vehicles of the invention. It comprises:
- a substrate (2),
- a soft touch layer (3),
- and a synthetic skin (4) having:
  - a decorative front layer (4.1),
  - and a supporting back layer (4.2).

The decorative front layer (4.1) and the supporting back layer (4.2) are intimately bonded each other. This means that the mechanical properties of the supporting back layer (4.2.) are transferred to the whole synthetic skin (4), improving this way its behaviour.

The substrate (2) layer can be made for example of plastic material such as polypropylene (PP), acrylonitrile butadiene styrene (ABS) or can be made of composite material, such as a plastic matrix with any kind of reinforcing material.

The soft touch layer (3) can be a spacer fabric, or a foam made for example of polyurethane (PU).

The synthetic skin (4) can be made for example of polyvinyl chloride (PVC), thermoplastic elastomer (TPE), or thermoplastic polyurethane (TPU).

This kind of materials is usually processed by slush molding. So the synthetic skin (4) of the invention is preferably manufactured by slush molding.

Preferably both the decorative front layer (4.1) and the supporting back layer (4.2) are made of the same material family, but they could as well be made of different material families.

The total thickness of the synthetic skin (4) is less than 1.2 mm, preferably less than 1 mm, wherein the thickness of the supporting back layer (4.2) is greater than the thickness of the decorative front layer (4.1).

According to a particular embodiment of the invention, the thickness of the supporting back layer (4.2) is 0.6 mm and the thickness of the decorative front layer (4.1) is 0.4 mm.

Figure 2:
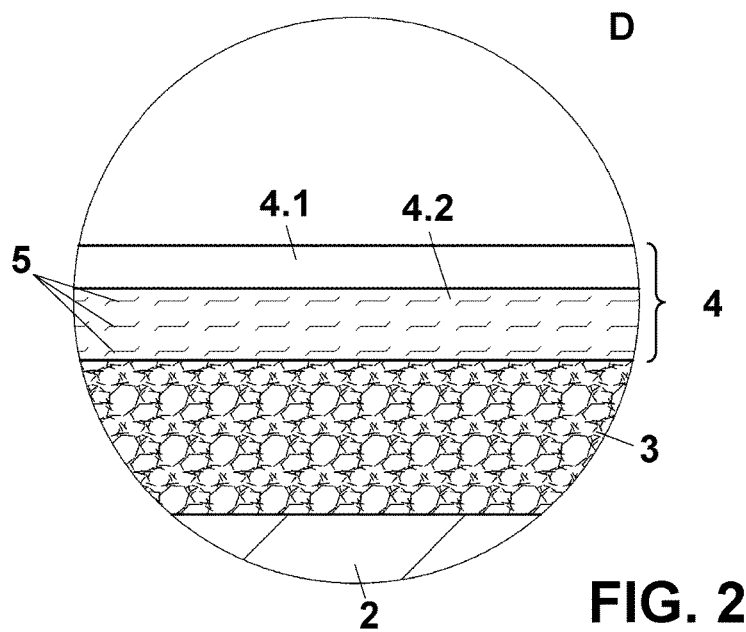
FIG. 2 shows a schematic enlarged view of the detail D represented in the FIG. 1 according to a first embodiment.

Additionally, as FIG. 2 shows, the supporting back layer comprises a filler (5) with a maximum size less than 0.4 mm, preferably less than 0.3 mm, and a weight ratio less than 10% of the total weight of the supporting back layer (4.2).

The filler can be chosen from microparticles, fibers, and microspheres.

In the case of microparticles, these can be chosen from natural, synthetic, and mineral materials.

In the case of fibers, these can be chosen from natural, artificial, synthetic, and mineral materials. Particularly, one preferred example is the use of cellulose fibers, either natural or artificial, such as viscose. Other preferred example is the use chopped fibers made of basalt or glass.

In the case of microspheres these can be chosen from synthetic and mineral materials.

In the particular case in which the filler (5) comprises fibers, the adherence between the synthetic skin (4) and soft touch foam layer (3) is considerably improved due to the aspect ratio of the fibers.

In general, any kind of filler (5) which achieves to modify the surface of the synthetic skin (4) in contact with the soft touch foam layer (3) into a rough surface improves the adherence between both layers (3, 4).

This increase even more the transfer of the mechanical properties from the supporting back layer (4.2) to the whole assembly, improving this way the correct tearing of the synthetic skin (4) when the airbag is triggered.

Figure 3:
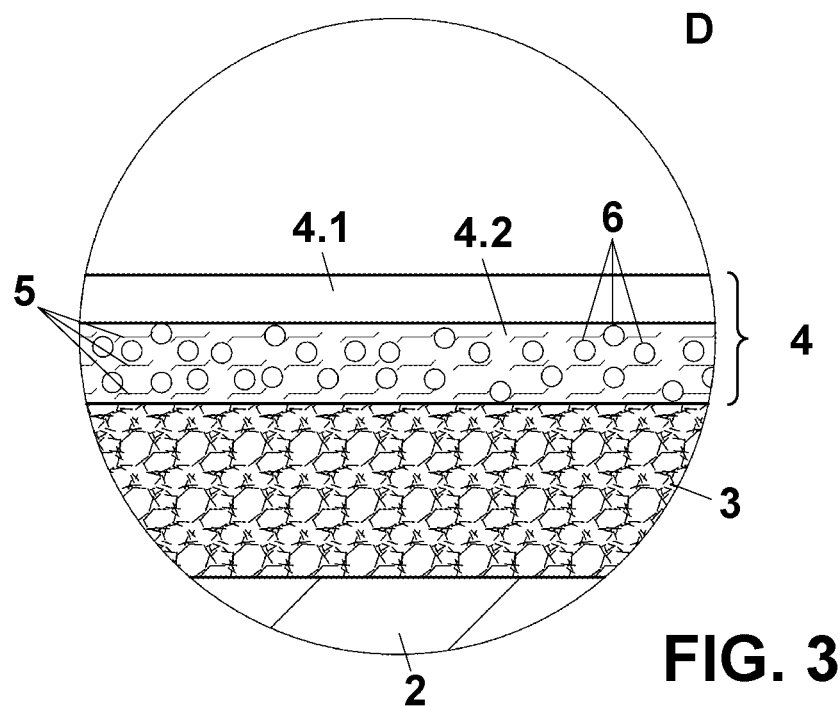
FIG. 3 shows a schematic enlarged view of the detail D represented in the FIG. 1 according to a second embodiment.

According to an improvement of the invention shown in FIG. 3, the supporting back layer (4.2) is a foam. In order to reduce even more the total weight of the synthetic skin (4), once the mechanical behaviour of the skin is improved due to the addition of the filler (5), it is possible to foam the supporting back layer, keeping the mechanical behaviour of the assembly under control. Therefore the supporting back layer (4.2) comprises the filler (5) formed in this particular case by fibers, and voids or cells (6) formed in the foam structure.

Figure 4:
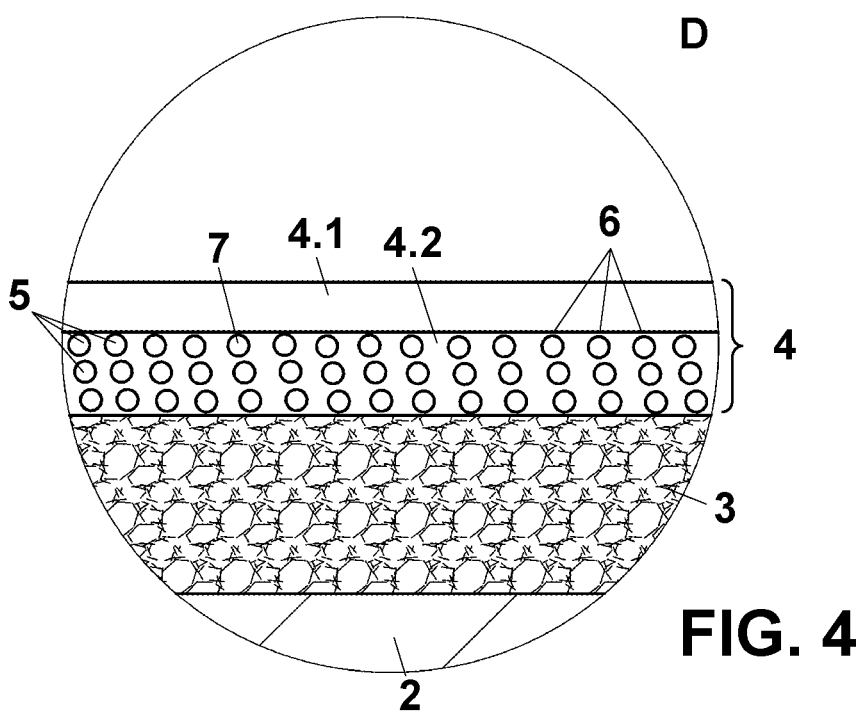
FIG. 4 shows a schematic enlarged view of the detail D represented in the FIG. 1 according to a third embodiment.

According to a particular case represented in FIG. 4, the filler (5) comprises void microspheres (7) which allow, in addition to the induction of an homogeneous distribution of discontinuities, a syntactic foaming effect, achieving as well this way an additional weight reduction.

The invention claimed is:
1. Soft touch interior trim for vehicles comprising:
   a substrate,
   a soft touch layer,
   a synthetic skin having:
      a decorative front layer, and
      a supporting back layer,
   wherein the decorative front layer and the supporting back layer are intimately bonded to each other,
   wherein the total thickness of the synthetic skin is less than 1.2 mm, the thickness of the supporting back layer is greater than the thickness of the decorative front layer,
   wherein,
   the supporting back layer comprises a filler with a maximum size less than 0.4 mm and a weight ratio less than 10% of the total weight of the supporting back layer so as to start tearing of the synthetic skin along predefined points before it starts to flow during deployment of an airbag;
   wherein the filler modifies a surface of the synthetic skin in contact with the soft touch layer into a rough surface for adherence between the synthetic skin and the soft touch layer; wherein the filler comprises cellulose fibers.

2. The soft touch interior trim for vehicles according to claim 1 wherein the soft touch layer is either a spacer fabric, or a foam.

3. The soft touch interior trim for vehicles according to claim 1 wherein the maximum size of the filler is less than 0.3 mm.

4. The soft touch interior trim for vehicles according to claim 1 wherein the supporting back layer is a foam.

5. The soft touch interior trim for vehicles according to claim 4, wherein the cellulose fibers provide homogeneous distribution of discontinuities in the supporting back layer.

6. The soft touch interior trim for vehicles according to claim 1 wherein the material of the synthetic skin is processed by slush molding.

7. The soft touch interior trim for vehicles according to claim 6 wherein the material of the synthetic skin is selected from the group of polyvinyl chloride, thermoplastic elastomer and thermoplastic polyurethane.

8. The soft touch interior trim for vehicles according to claim 1, wherein the cellulose fibers are viscose fibers.

9. The soft touch interior trim for vehicles according to claim 8, wherein the substrate comprises a plastic matrix.

10. The soft touch interior trim for vehicles according to claim 9, wherein the viscose fibers provide homogeneous distribution of discontinuities in the supporting back layer.

11. The soft touch interior trim for vehicles according to claim 1, wherein the cellulose fibers provide homogeneous distribution of discontinuities in the supporting back layer.

\* \* \* \* \*